J. B. EADS.

Iron-Bridge.

No. 6,446. Reissued May 25, 1875.

ATTEST:

Robt. Burns.
Henry Tanner

INVENTOR:

James B. Eads
By Knight Bros.
Attys.

THE GRAPHIC CO. PHOTO-LITH. 39 & 41 PARK PLACE, N.Y.

UNITED STATES PATENT OFFICE.

JAMES B. EADS, OF ST. LOUIS, MISSOURI.

IMPROVEMENT IN IRON BRIDGES.

Specification forming part of Letters Patent No. 142,381, dated September 2, 1873; reissue No. 6,446, dated May 25, 1875; application filed May 10, 1875.

DIVISION C.

*To all whom it may concern:*

Be it known that I, JAMES B. EADS, of St. Louis, St. Louis county, State of Missouri, have invented an Improvement in Bridges, of which the following is a specification:

My invention consists in forming the abutments of solid or hollow columns, inclined together in pairs, and joined together at their upper ends like the two sides of the letter A, with proper bracing between them, so that the thrust of the arch may be received at the point of junction of the two columns, and will be resisted by one column in compression, and allow the weight of the other to be availed of to resist the overturning of the columns or piers thus formed.

Figure 1:
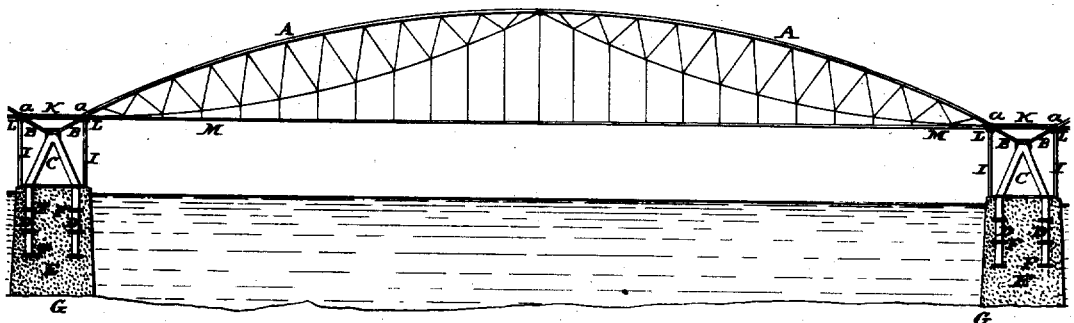
Figure 2:
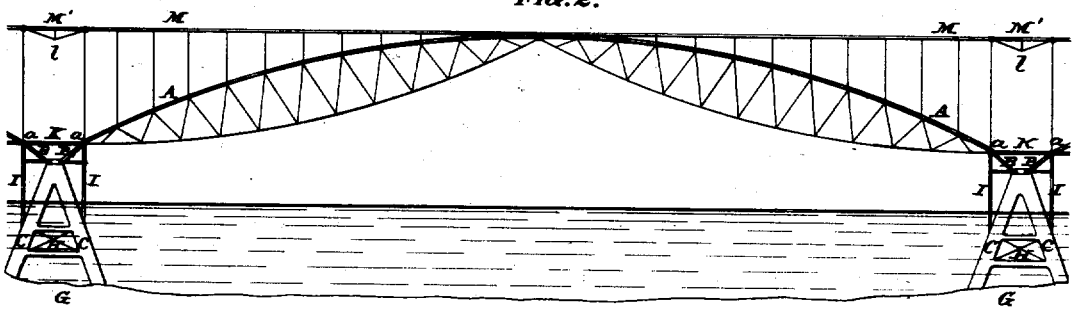

In the drawings, Figure 1 is a side view of a bridge with the piers or abutments shown in vertical section. Fig. 2 is a side view of a deck-bridge, with the striding abutments extending down to the natural foundation.

The end *a* of the arch A has bearing upon the abutment (as shown) at the end of a diagonal brace, B, extending in the direction of the thrust of the arch, the other end of this brace or strut being secured to the apex of the abutment structure. This brace or strut B really constitutes an extension of the arch A.

The abutment structure has two inclined pillars or supports, C C, for each rib or arch, which pillars are securely joined together at the top, and spread out downward like the two sides of the letter A. These pillars or legs C may be secured to vertical pillars D, supported in masonry E, and having collars F, to give a firmer hold upon the masonry; or the legs C may extend down to the solid rock or other foundation, G, as shown in Fig. 2. The legs C, especially in the latter form, should have suitable bracing H to keep them in their proper relative position. These pairs of A-shaped columns are to be supported against the current or other lateral force by bracing between each two or more pairs, forming a pier or abutment.

I I are vertical struts, extending from the joints *a* to the abutment or pier structure, to prevent the joint *a* from moving vertically. K K are horizontal struts extending from the end or joint *a* of one arch to the same joint of the arch next adjoining in a longitudinal direction, (or to the abutment,) to prevent the horizontal movement of the joint or end *a*.

The vertical struts I and horizontal ones K may be omitted by securing the arch directly to the abutment; but in this case the clear span between the opposite ends of the arch will be lessened by the amount of space occupied by the stride of the abutment columns at the water-line.

L is a transverse beam attached to the struts I to sustain the end of the roadway M. The roadway M is not attached to beam L if it is of metal, but is free to move longitudinally thereon, as its length is increased or diminished by changes of temperature. If the longitudinal members of the roadway be of timber it may be fixed to the beam L, as its length would not be affected by temperature.

In Fig. 2, M′ is a section of roadway inserted over the piers and between the main parts M, over the spans, the parts M′ being connected to those M by a slotted joint, or its equivalent, to allow the longitudinal expansion and contraction of the metal. The section M′ may be stiffened by a truss, *l*.

I claim as my invention—

The bridge-pier, composed of columns C C, inclined and joined together in pairs, the planes of said pairs being located in the line of, or parallel with, the thrust of the arch.

JAS. B. EADS.

Witnesses:
SAML. KNIGHT,
R. S. ELLIOTT.